United States Patent
Zeng et al.

(10) Patent No.: US 8,134,919 B2
(45) Date of Patent: Mar. 13, 2012

(54) METHOD AND DEVICE FOR PROTECTING ETHERNET TREE SERVICES

(75) Inventors: Li Zeng, Shenzhen (CN); Hao Long, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 322 days.

(21) Appl. No.: 12/572,078

(22) Filed: Oct. 1, 2009

(65) Prior Publication Data

US 2010/0074098 A1  Mar. 25, 2010

Related U.S. Application Data

(63) Continuation of application No. PCT/CN2008/070625, filed on Mar. 28, 2008.

(30) Foreign Application Priority Data

Apr. 3, 2007 (CN) .......................... 2007 1 0089583

(51) Int. Cl.
*H04J 1/00* (2006.01)
(52) U.S. Cl. .......................... 370/225; 370/256; 709/252
(58) Field of Classification Search .......... 370/216–228, 370/254–256; 709/252
See application file for complete search history.

(56) References Cited

U.S. PATENT DOCUMENTS

| 2003/0126299 A1 | 7/2003 | Shah-Heydari |
| 2007/0047556 A1 | 3/2007 | Raahemi et al. |

FOREIGN PATENT DOCUMENTS

| CN | 1482769 A | 3/2004 |
| CN | 1555163 A | 12/2004 |
| CN | 1581716 A | 2/2005 |
| CN | 101282276 B | 11/2011 |

OTHER PUBLICATIONS

Written Opinion of the International Searching Authority in corresponding PCT Application No. PCT/CN2008/070625 (Jul. 17, 2008).
Extended European Search Report in corresponding European Application No. 08715361.5 (May 26, 2010).
"MEF 10.1—Ethernet Services Attributes Phase 2," Technical Specification, Nov. 2006, Metro Ethernet Forum, Los Angeles, California.
International Search Report in corresponding PCT Application No. PCT/CN2008/070625 (Jul. 17, 2008).

*Primary Examiner* — Pao Sinkantarakorn
(74) *Attorney, Agent, or Firm* — Leydig, Voit & Mayer, Ltd.

(57) ABSTRACT

A method and device for protecting Ethernet Tree (E-Tree) services are disclosed. An ID is configured for each branch of the E-Tree. The method includes: determining a branch that needs to perform switching; notifying the ID of the branch that needs to perform switching to a work E-Tree through a root UNI of a protect E-Tree; and switching data over the branch that needs to perform switching from the work E-Tree to the protect E-Tree according to the ID of the branch that needs to perform switching. In the embodiments of the present invention, because an ID is configured for each branch of the E-Tree, the branch corresponding to the ID may be triggered to perform protection switching as required, thus implementing branch switching.

15 Claims, 5 Drawing Sheets

METHOD AND DEVICE FOR PROTECTING ETHERNET TREE SERVICES

CROSS-REFERENCE TO RELATED APPLICATIONS

This application is a continuation of International Patent Application No. PCT/CN2008/070625, filed on Mar. 28, 2008, which claims priority to Chinese Patent Application No. 200710089583.X, filed on Apr. 3, 2007, both of which are hereby incorporated by reference in their entireties.

FIELD OF THE INVENTION

The present invention relates to communication technologies, and in particular, to Ethernet tree (E-Tree) services.

BACKGROUND OF THE INVENTION

Figure 1:
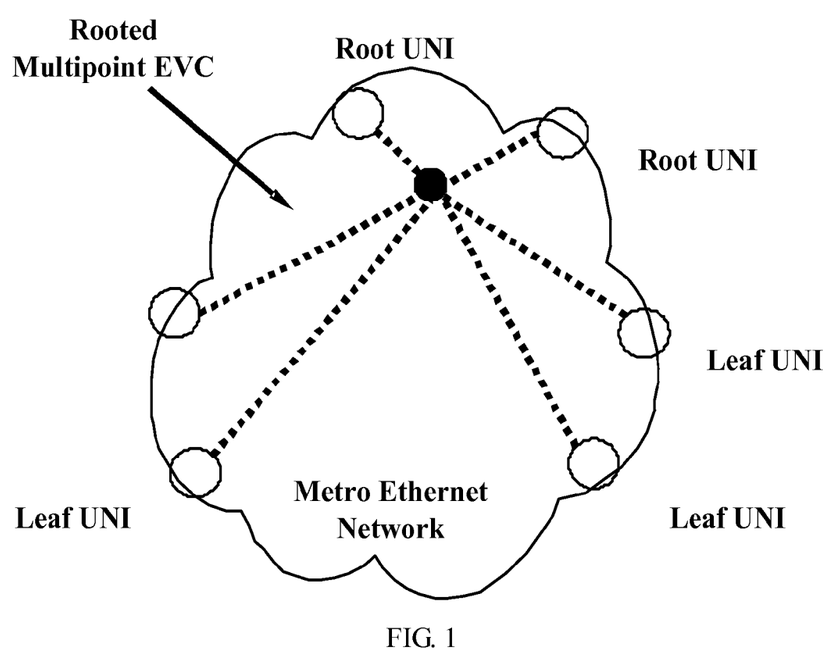
FIG. 1 shows a structure of an E-Tree in the prior art.

The E-Tree service is an Ethernet service that relates to multiple points. FIG. 1 shows a general structure of an E-Tree. An E-Tree includes one or more root User Network Interfaces (UNIs) and multiple leaf UNIs. A root UNI can communicate with any UNI; but a leaf UNI can only communicate with a root UNI. No communication between leaf UNIs is allowed. The E-Tree service cares about only attributes of the provided UNI, and does not care about detailed implementation in the network. The connection of an E-Tree is generally described through an Ethernet Virtual Circuit (EVC).

Currently, the protection solution specific to multi-point services in the prior art generally protects the E-Tree service by switching the whole tree. That is, when a fault occurs anywhere on an E-Tree EVC, the whole service is switched to the backup E-Tree EVC. Switching of the whole tree exerts an impact on the UNIs that are not affected by the fault, thus deteriorating the quality of the E-Tree service.

SUMMARY OF THE INVENTION

A method and device for protecting E-Tree services are provided in embodiments of the present invention, where an ID is configured for each branch of the E-Tree so that the branch corresponding to the ID may be triggered to perform protection switching as required, thus implementing switching of a specific branch.

The objectives of the embodiments of the present invention are achieved through the following technical solution:

A method for protecting E-Tree services is provided in an embodiment of the present invention, where an ID is configured for each branch of the E-Tree. The method includes:
determining a branch that needs to perform switching;
notifying the ID of the branch that needs to perform switching to a work E-Tree through a root UNI of a protect E-Tree; and
switching data over the branch that needs to perform switching from the work E-Tree to the protect E-Tree according to the ID of the branch that needs to perform switching.

A network device is provided in an embodiment of the present invention. The network device is a leaf UNI of a work E-Tree, and includes:
an ID storing unit, adapted to store the ID of a branch where the network device resides;
a protection switching unit, adapted to switch data over the branch that needs to perform switching to the protect E-Tree;
an ID sending unit, adapted to: query the ID storing unit, notify the found ID of the branch that needs to perform switching to the root UNI of the protect E-Tree, and trigger the protection switching unit; and
a detecting unit, adapted to: detect whether the branch where the network device resides needs to perform switching, and trigger the ID sending unit if determining that the branch needs to perform switching.

A network device is provided in another embodiment of the present invention. The network device is a leaf UNI of a protect E-Tree, and includes:
an ID storing unit, adapted to store the ID of a branch where the network device resides;
a protection switching unit, adapted to switch data over the branch that needs to perform switching to the protect E-Tree; and
a branch ID judging unit, adapted to: receive the ID of the branch that needs to perform switching, compare the received branch ID with the branch ID stored in the ID storing unit, and trigger the protection switching unit if the received branch ID is the same as the stored branch ID.

A network device is provided in another embodiment of the present invention. The network device is a root UNI of a work E-Tree, and includes:
an ID storing unit, adapted to store a correspondence between the ID of a branch where the network device resides and an interface;
a protection switching unit, adapted to switch data over the branch that needs to perform switching to a protect E-Tree according to the obtained ID of the branch that needs to perform switching;
an ID sending unit, adapted to: query the ID storing unit, notify the found ID of the branch that needs to perform switching to the root UNI of the protect E-Tree, and trigger the protection switching unit; and
a detecting unit, adapted to: detect whether the branch where the network device resides needs to perform switching, and trigger the ID sending unit if determining that the branch needs to perform switching.

A network device is provided in another embodiment of the present invention. The network device is a root UNI of a work E-Tree, and includes:
an ID storing unit, adapted to store a correspondence between the ID of a branch where the network device resides and an interface;
a protection switching unit, adapted to switch data over the branch that needs to perform switching to a protect E-Tree according to the obtained ID of the branch that needs to perform switching and the interface corresponding to the ID of the branch that needs to perform switching; and
a branch ID querying unit, adapted to: receive the ID of the branch that needs to perform switching, find the interface corresponding to the branch that needs to perform switching in the ID storing unit according to the branch ID, and trigger the protection switching unit.

A network device is provided in another embodiment of the present invention. The network device is a root UNI of a protect E-Tree, and includes:
an APS message generating unit, adapted to generate an Automatic Protection Switching (APS) message which carries the ID of the branch that needs to perform switching according to the obtained ID of the branch that needs to perform switching; and an APS message sending unit, adapted to send the APS message generated by the APS message generating unit to the leaf UNI of the protect E-Tree or the root UNI of the work E-Tree.

To sum up, a method and device for protecting E-Tree services are provided in the embodiments of the present invention, where an ID is configured for each branch of the E-Tree so that the branch corresponding to the ID may be triggered to perform protection switching as required, thus implementing switching of a specific branch.

DETAILED DESCRIPTION OF THE INVENTION

The method and device provided in the embodiments of the present invention are detailed below with reference to accompanying drawings.

First, the method under the present invention is described below.

In the implementation of the method under the present invention, an ID is configured for each branch of the E-Tree in the E-Tree service beforehand, and then an ID is configured for the branch corresponding to the downlink interface of the leaf UNI and the root UNI of the E-Tree. The branch ID may also be configured additionally, and the branch may be represented by the Media Access Control (MAC) address of the leaf UNI directly.

Figure 2:
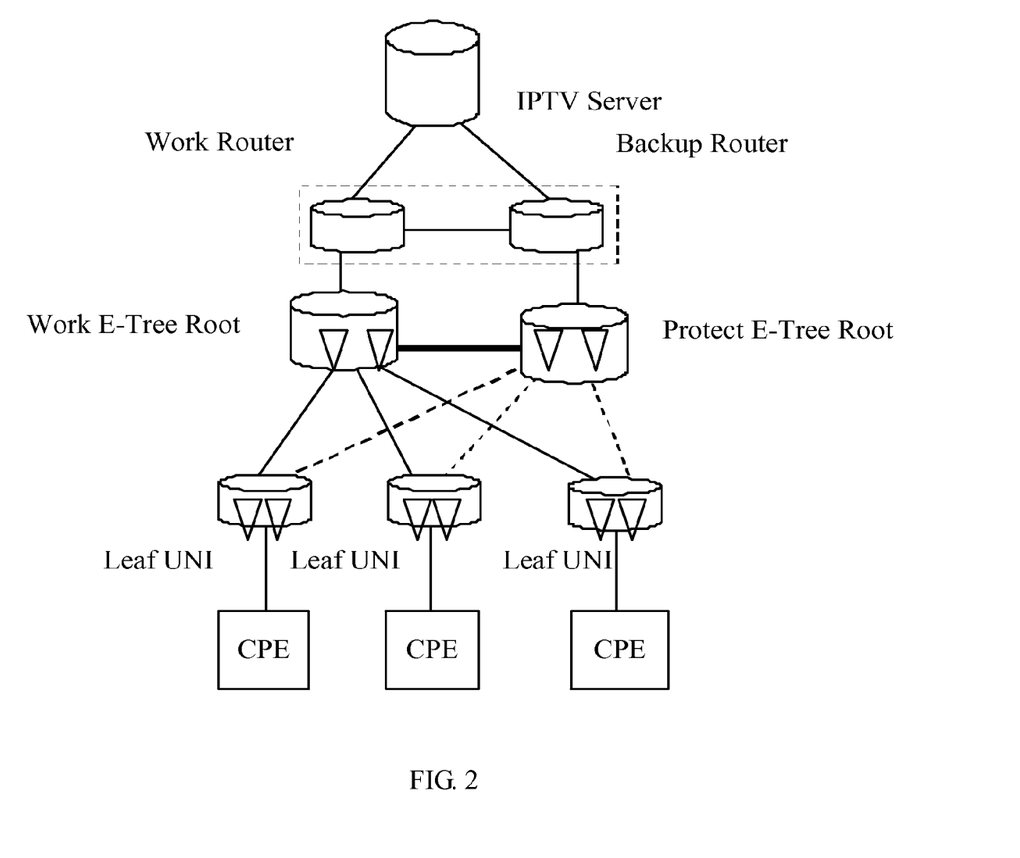
FIG. 2 shows a structure and configuration of an E-Tree in an embodiment of the present invention.

FIG. 2 shows a structure and configuration of an E-Tree for protecting IPTV services. As shown in FIG. 2, a user transmits IPTV service data from a service provider network to a user network. The service provider is connected to the network of a network provider through an E-Tree root UNI, with a view to sending video data to the user or processing user requests. The user network accesses the network of the network provider through an E-Tree leaf UNI, with a view to receiving data or sending video requests. The node where the E-Tree root UNI resides is called an E-Tree root UNI, and the node where the E-Tree leaf UNI resides is called an E-Tree leaf UNI. In FIG. 2, a protect E-Tree is set up for protecting a work E-Tree. The work E-Tree and the protect E-Tree have different root UNIs, and the root UNIs are connected to three identical leaf UNIs. A root UNI and a leaf UNI constitute a branch of the E-Tree. The work E-Tree root UNI is connected to the protect E-Tree root UNI through a root link. The work E-Tree and the protect E-Tree have the same or different downlink VLANs. The VLAN configured on the root link is different from that of the work E-Tree and the protect E-Tree.

FIG. 2 illustrates OAM configuration of a root UNI and a leaf UNI. The work E-Tree EVC and the protect E-Tree EVC belong to two different Maintenance Entity Groups (MEGs) respectively, and the root UNI and the leaf UNI are configured as Maintenance Entity Points (MEPs). For the root link that connects the work E-Tree root UNI and the protect E-Tree root UNI, the interfaces on both sides of the link are configured into an MEG, and both interfaces are configured as MEPs. The three MEGs are on the same level. An EVC ID is configured for a work E-Tree EVC, and an ID is configured for each branch in the EVC. On each leaf UNI applicable to the work E-Tree EVC, the EVC ID corresponding to the leaf UNI as well as a branch ID are configured; and on the work E-Tree root UNI, the EVC ID corresponding to the UNI as well as a branch table are configured. The branch table records the correspondence between each branch ID and the ID of the UNI connected to the E-Tree root UNI.

The embodiments of the present invention need to maintain consistent client MAC addresses on the work E-Tree root UNI and the protect E-Tree root UNI, with a view to subsequent protection switching. The consistency of the client MAC address between the two UNIs is ensured in the following way:

When a leaf UNI learns a client MAC address, a Multiple MAC Registration Protocol (MMRP) message is sent on the protection branch of the leaf UNI. This message carries the client MAC address which is sent on the protection branch. The protect E-Tree root UNI registers the client MAC address in the forwarding table upon receiving the message. The egress interface corresponding to the client MAC address in the forwarding table is the interface that receives the message, namely, the interface corresponding to the protection branch. If the leaf UNI learns a multicast forwarding entry, the MMRP message carries a multicast address. Upon receiving the message, the protect E-Tree root UNI adds the interface corresponding to the protection branch into the egress interface list of the multicast address in the forwarding table.

When a client MAC address is deleted in the aging operation of the forwarding table of the leaf UNI, an MMRP message defined by IEEE 802.1ak is sent on the protection branch of the leaf UNI. The message carries the client MAC address. Upon receiving the message, the protect E-Tree root UNI deletes the client MAC address from the forwarding table. When the leaf UNI deletes a multicast forwarding entry, the MMRP message carries a multicast address. Upon receiving the message, the protect E-Tree root UNI deletes the interface corresponding to the protection branch from the egress interface list of the multicast address in the forwarding table.

Optionally, when the work E-Tree root UNI learns or ages out a client MAC address from the UNI, the client MAC address may be registered at the leaf UNI similarly. In this case, the MMRP message is multicast to all leaf UNIs along the tree.

To implement protection switching correctly, this embodiment also includes:

For a work E-Tree root UNI, a bridge is set at the ingress in the downlink direction. According to the destination MAC address, the bridge can choose whether to send data from the work E-Tree, or send data from the protect E-Tree, or send data from both the work E-Tree and the protect E-Tree. A bridge relation table that includes a destination MAC address and the foregoing three sending modes is maintained in the bridge. A selective receiver is set in the uplink direction at the ingress. The selective receiver receives data selectively from both the work E-Tree and the root link simultaneously.

Optionally, for the purpose of load sharing on the work E-Tree and the protect E-Tree, a bridge may also be set on the protect E-Tree.

In the method under the present invention, the ID of the branch that needs to perform switching is carried in the protection switching information, and the branch that needs to perform switching and corresponds to the branch ID is triggered to perform protection switching, thus implementing branch switching. In the embodiment of the present invention, the work E-Tree is an Ethernet tree that is used for work, and the protect E-Tree is an Ethernet tree that exercises protection. The method involves two scenarios:

In the first scenario, the leaf UNI of the work E-Tree (such as a leaf UNI) discovers a branch fault, and the method includes the following steps:

The work E-Tree leaf UNI that discovers the branch fault sends an APS message to the protect E-Tree root UNI (such as a root UNI) on the protect E-Tree, where the message carries the ID of the branch that needs to perform switching; switches the data of the branch that needs to perform switching to the branch corresponding to the protect E-Tree; and sends and receives data on the branch corresponding to the protect E-Tree;

The protect E-Tree root UNI terminates the APS message after receiving the message; generates a new APS message that carries the ID of the branch that needs to perform switching; and sends the new APS message to the work E-Tree root UNI through a root link;

The work E-Tree root UNI switches the data over the branch to the root link after receiving the new APS message from the protect E-Tree root UNI. The switching includes: querying the correspondence between the branch ID (such as the MAC address of the leaf UNI) and the client MAC address in the branch table maintained in the work E-Tree root UNI, and changing the client MAC address corresponding to the branch in the service instance forwarding table to the mode of sending from the protect E-Tree.

In the second scenario, the root UNI of the work E-Tree discovers a branch fault, and the method includes the following steps:

The work E-Tree root UNI notifies a branch fault to the protect E-Tree root UNI through an APS message if the work E-Tree root UNI detects the fault on a branch, where the message carries the ID of the branch that needs to perform switching, and switches the data over the faulty branch to the root link. The switching includes: querying the correspondence between the branch ID and the client MAC address in the branch table maintained in the work E-Tree root UNI, and changing the client MAC address corresponding to the branch in the service instance forwarding table to the mode of sending from the protect E-Tree. The specific switching process is based on the mature solution in the prior art, and is not described further.

The protect E-Tree root UNI terminates the APS message after receiving the message; generates a new APS message according to the branch ID carried in the message; and sends the new APS message to the corresponding protect E-Tree branch, where the new APS message carries the ID of the branch that needs to perform switching.

After receiving the APS message, the protect E-Tree leaf UNI judges whether the branch ID carried in the message is the same as the branch ID configured in the leaf UNI; if the branch ID is the same, the protect E-Tree leaf UNI switches the data over the branch that needs to perform switching to the protect E-Tree, and sends and receives data on the corresponding branch of the protect E-Tree; and, if the branch ID is not the same, no switching is performed.

The downlink packet received by the root UNI from the UNI is processed in the following way:

Processing flow 1: The root UNI receives a data packet from the UNI, and determines whether the packet is transmitted through a work E-Tree or a protect E-Tree according to the information such as the destination address of the data packet;

If the data packet is transmitted through a work E-Tree, the root UNI encapsulates the data packet with a downlink VLAN tag of the work E-Tree, queries the forwarding table of the work E-Tree, and transmits the packet to the leaf UNI. If the data packet is transmitted through a protect E-Tree, the root UNI performs MAC-in-MAC encapsulation for the data packet according to the root link information, namely, adds an Ethernet header to the exterior of the data packet by using the MAC address of the protect E-Tree root UNI as a destination address, using the MAC address of the work E-Tree root UNI as a source address, and using the VLAN information configured on the root link as a VLAN tag, and then sends the encapsulated data packet to the protect E-Tree root UNI through the root link. It is worthy of attention that for some multicast traffic, data packets may be transmitted on the work E-Tree and the protect E-Tree simultaneously.

Processing flow 2: After receiving the data packet from the root link, the protect E-Tree root UNI performs MAC-in-MAC decapsulation for the data packet to obtain the original data packet first, encapsulates the decapsulated data packet with a downlink VLAN tag of the protect E-Tree, queries the forwarding table of the protect E-Tree, and transmits the data packet to the leaf UNI.

Processing flow 3: After receiving the data packet from the work E-Tree or protect E-Tree, the leaf UNI deletes the VLAN tag of the work E-Tree or protect E-Tree from the data packet to obtain the original data packet, and sends the original data packet to the user network.

The uplink packet received by the leaf UNI from the UNI is processed in the following way:

Processing flow 1: The leaf UNI receives a data packet from the UNI, and determines whether the packet is transmitted through a work E-Tree or a protect E-Tree according to the current bridge information;

If the data packet is transmitted through a work E-Tree, the leaf UNI encapsulates the data packet with an uplink VLAN tag of the work E-Tree, and transmits the encapsulated packet to the root UNI of the work E-Tree; or if the data packet is transmitted through a protect E-Tree, the leaf UNI encapsulates the data packet with an uplink VLAN tag of the protect E-Tree, and transmits the encapsulated packet to the root UNI of the protect E-Tree.

Processing flow 2: After receiving the data packet from the network interface, the protect E-Tree root UNI deletes the protect E-Tree VLAN tag from the received data packet to obtain the original data packet, and then performs MAC-in-MAC encapsulation for the original data packet according to the root link information, namely, adds an outer Ethernet header to the exterior of the original data packet by using the MAC address of the work E-Tree root UNI as a destination address, using the MAC address of the protect E-Tree root UNI as a source address, and using the VLAN information configured on the root link as a VLAN tag, and then sends the encapsulated data packet to the work E-Tree root UNI through the root link.

Processing flow 3: After receiving the data packet from the work E-Tree, the work E-Tree root UNI deletes the VLAN tag of the work E-Tree from the data packet to obtain the original data packet, and sends the original data packet to the user network; and after receiving the data packet from the root link, the work E-Tree root UNI performs MAC-in-MAC decapsulation for the data packet to obtain the original data packet, and sends the original data packet to the user network.

The device under the present invention is detailed below.

Figure 3:
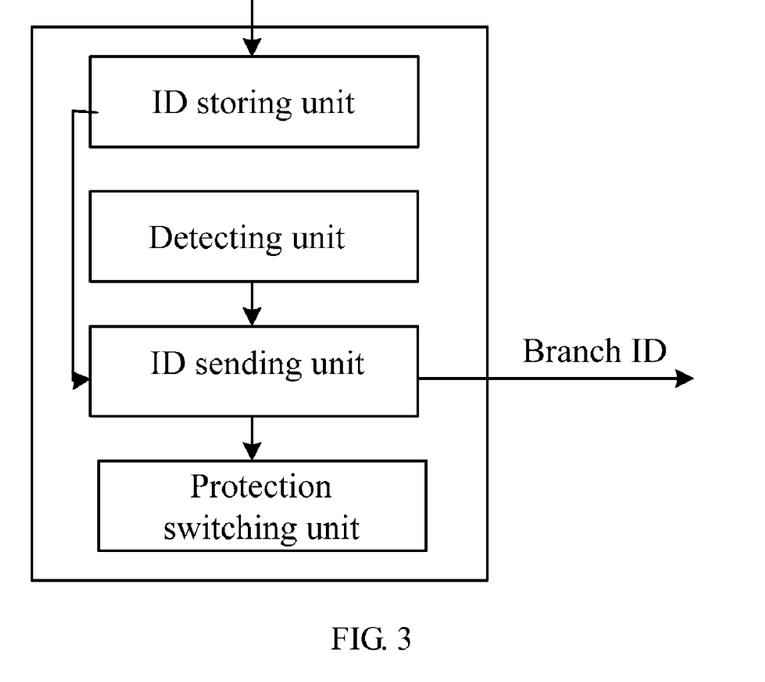
FIG. 3 shows a structure of a network device in an embodiment of the present invention.

As shown in FIG. 3, a network device provided in an embodiment of the present invention is an E-Tree leaf UNI, and includes:

an ID storing unit, adapted to store the ID of a branch where the network device resides;

a protection switching unit, adapted to switch data over the branch that needs to perform switching to a protect E-Tree, where the specific switching process is detailed in the method embodiment and is not described further;

an ID sending unit, adapted to: query the ID storing unit when the work E-Tree leaf UNI discovers a branch that needs to perform switching, add the ID of the branch that needs to perform switching to an APS message, send the APS message to the protect E-Tree root UNI, and trigger the protection switching unit; and detecting unit, adapted to: detect whether the branch where the network device resides needs to perform switching, and trigger the ID sending unit if determining that the branch needs to perform switching.

After the network device receives the data packet from the work E-Tree or protect E-Tree, the protection switching unit of the network device deletes the VLAN tag of the work E-Tree or protect E-Tree from the data packet to obtain the original data packet, and sends the original data packet to the user network.

After the network device receives the data packet from the UNI, the protection switching unit of the network device determines whether the packet is transmitted through a work E-Tree or a protect E-Tree according to the current bridge information. If the data packet is transmitted through a work E-Tree, the protection switching unit encapsulates the data packet with an uplink VLAN tag of the work E-Tree, and transmits the encapsulated packet to the root UNI of the work E-Tree; or if the data packet is transmitted through a protect E-Tree, the protection switching unit encapsulates the data packet with an uplink VLAN tag of the protect E-Tree, and transmits the encapsulated packet to the root UNI of the protect E-Tree.

Figure 4:
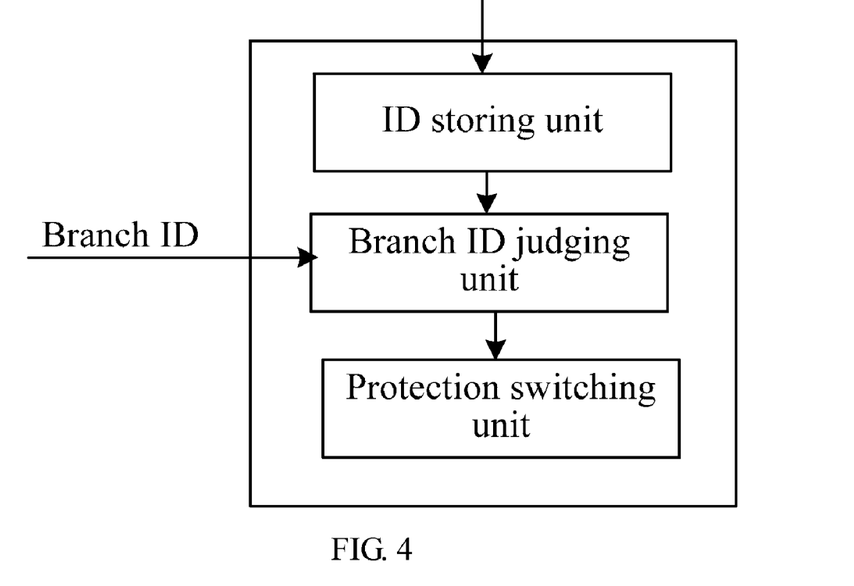
FIG. 4 shows a structure of a network device in another embodiment of the present invention.

As shown in FIG. 4, a network device is provided in another embodiment of the present invention. The network device is a leaf UNI of a protect E-Tree, and includes:

an ID storing unit, adapted to store the ID of a branch where the network device resides;

a protection switching unit, adapted to switch data over the branch that needs to perform switching to the protect E-Tree, where the specific switching process is detailed in the method embodiment and is not described further; and a branch ID judging unit, adapted to: compare the obtained branch ID with the branch ID stored in the ID storing unit after the work E-Tree root UNI discovers the branch that needs to perform switching, and trigger the protection switching unit if the obtained branch ID is the same as the stored branch ID.

After the network device receives the data packet from the work E-Tree or protect E-Tree, the protection switching unit of the network device deletes the VLAN tag of the work E-Tree or protect E-Tree from the data packet to obtain the original data packet, and sends the original data packet to the user network.

After the network device receives the data packet from the UNI, the protection switching unit of the network device determines whether the packet is transmitted through a work E-Tree or a protect E-Tree according to the current bridge information. If the data packet is transmitted through a work E-Tree, the protection switching unit encapsulates the data packet with an uplink VLAN tag of the work E-Tree, and transmits the encapsulated packet to the root UNI of the work E-Tree; or if the data packet is transmitted through a protect E-Tree, the protection switching unit encapsulates the data packet with an uplink VLAN tag of the protect E-Tree, and transmits the encapsulated packet to the root UNI of the protect E-Tree.

Figure 5:
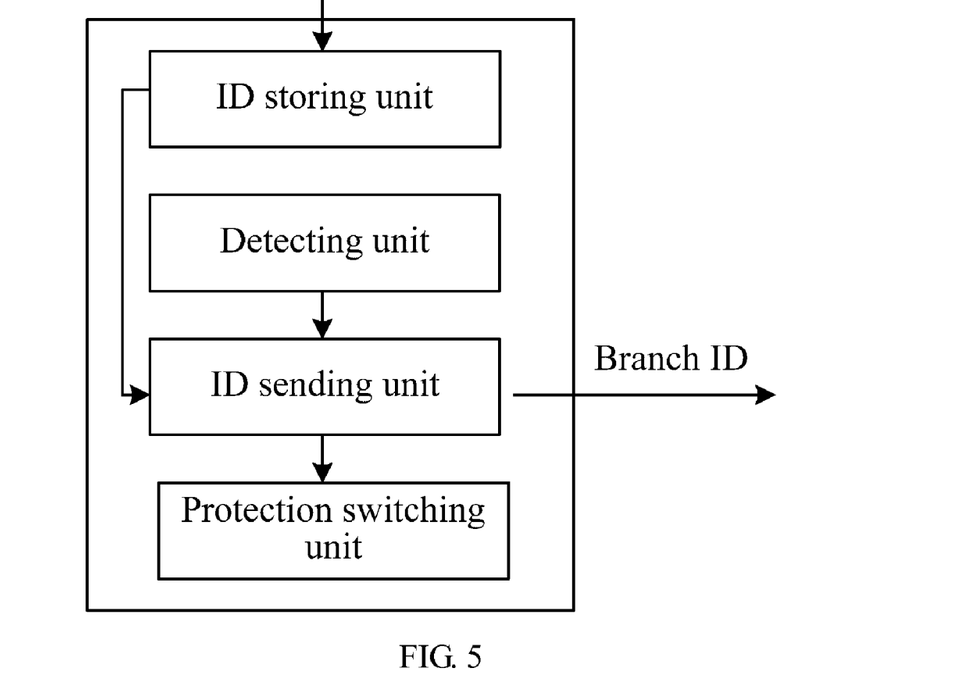
FIG. 5 shows a structure of a network device in another embodiment of the present invention.

As Shown in FIG. 5, a network device is provided in another embodiment of the present invention. The network device is a root UNI of a work E-Tree, and includes:

an ID storing unit, adapted to store the ID of a branch where the network device resides;

an ID sending unit, adapted to: notify the ID of the branch that needs to perform switching to a protect E-Tree root UNI when the work E-Tree root UNI discovers the branch that needs to perform switching, and trigger a protection switching unit;

the protection switching unit, adapted to switch data over the branch that needs to perform switching to the protect E-Tree according to the obtained ID of the branch that needs to perform switching, where the specific switching process is detailed in the method embodiment and is not described further; and a detecting unit, adapted to: detect whether the branch where the network device resides needs to perform switching, and trigger the ID sending unit if determining that the branch needs to perform switching.

After the network device receives the data packet from the UNI, the protection switching unit of the network device determines whether the packet is transmitted through a work E-Tree or a protect E-Tree according to the destination address information of the data packet. If the data packet is transmitted through a work E-Tree, the protection switching unit encapsulates the data packet with a downlink VLAN tag of the work E-Tree, queries the forwarding table of the work E-Tree, and transmits the packet to the leaf UNI; or if determining that the data packet is transmitted through a protect E-Tree, the protection switching unit performs MAC-in-MAC encapsulation for the data packet according to the root link information, namely, adds an Ethernet header to the exterior of the data packet by using the MAC address of the protect E-Tree root UNI as a destination address, using the MAC address of the work E-Tree root UNI as a source address, and using the VLAN information configured on the root link as a VLAN tag, and then sends the encapsulated data packet to the protect E-Tree root UNI through the root link.

It is worthy of attention that for some multicast traffic, the protection switching unit may enable simultaneous transmission of data packets on the work E-Tree and the protect E-Tree.

After the network device receives the data packet from the work E-Tree, the protection switching unit of the network device deletes the VLAN tag of the work E-Tree from the data packet to obtain the original data packet, and sends the original data packet to the user network. After the network device receives the data packet from the root link, the protection switching unit performs MAC-in-MAC decapsulation for the data packet to obtain the original data packet, and sends the original data packet to the user network.

Figure 6:
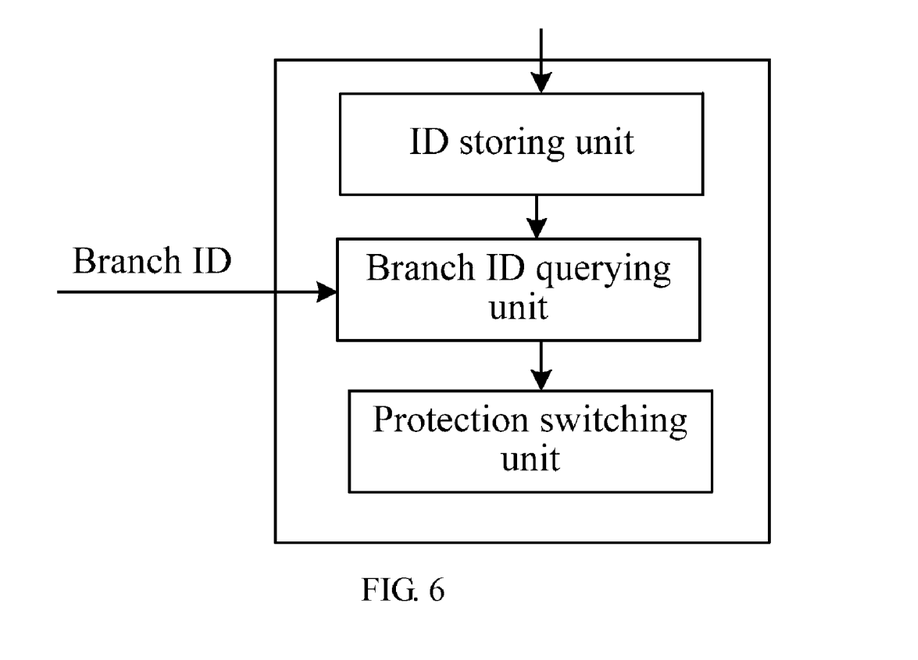
FIG. 6 shows a structure of a network device in another embodiment of the present invention.

As shown in FIG. 6, a network device is provided in another embodiment of the present invention. The network device is a root UNI of a work E-Tree, and includes:

an ID storing unit, adapted to store a correspondence between the ID of a branch where the network device resides and an interface;

a protection switching unit, adapted to switch data over the branch that needs to perform switching to a protect E-Tree according to the obtained ID of the branch that needs to perform switching as well as the interface corresponding to the obtained ID, where the specific switching process is detailed in the method embodiment and is not described further; and a branch ID querying unit, adapted to: query the ID storing unit when the work E-Tree leaf UNI discovers the branch that needs to perform switching, and trigger the protection switching unit according to the received branch ID and the correspondence between the branch and the interface in the branch table.

After the network device receives the data packet from the UNI, the protection switching unit of the network device determines whether the packet is transmitted through a work E-Tree or a protect E-Tree according to the destination address information of the data packet. If the data packet is transmitted through a work E-Tree, the protection switching unit encapsulates the data packet with a downlink VLAN tag of the work E-Tree, queries the forwarding table of the work E-Tree, and transmits the packet to the leaf UNI; or if determining that the data packet is transmitted through a protect E-Tree, the protection switching unit performs MAC-in-MAC encapsulation for the data packet according to the root link information, namely, adds an Ethernet header to the exterior of the data packet by using the MAC address of the protect E-Tree root UNI as a destination address, using the MAC address of the work E-Tree root UNI as a source address, and using the VLAN information configured on the root link as a VLAN tag, and then sends the encapsulated data packet to the protect E-Tree root UNI through the root link.

It is worthy of attention that for some multicast traffic, the protection switching unit may enable simultaneous transmission of data packets on the work E-Tree and the protect E-Tree.

After the network device receives the data packet from the work E-Tree, the protection switching unit of the network device deletes the VLAN tag of the work E-Tree from the data packet to obtain the original data packet, and sends the original data packet to the user network. After the network device receives the data packet from the root link, the protection switching unit performs MAC-in-MAC decapsulation for the data packet to obtain the original data packet, and sends the original data packet to the user network.

Figure 7:
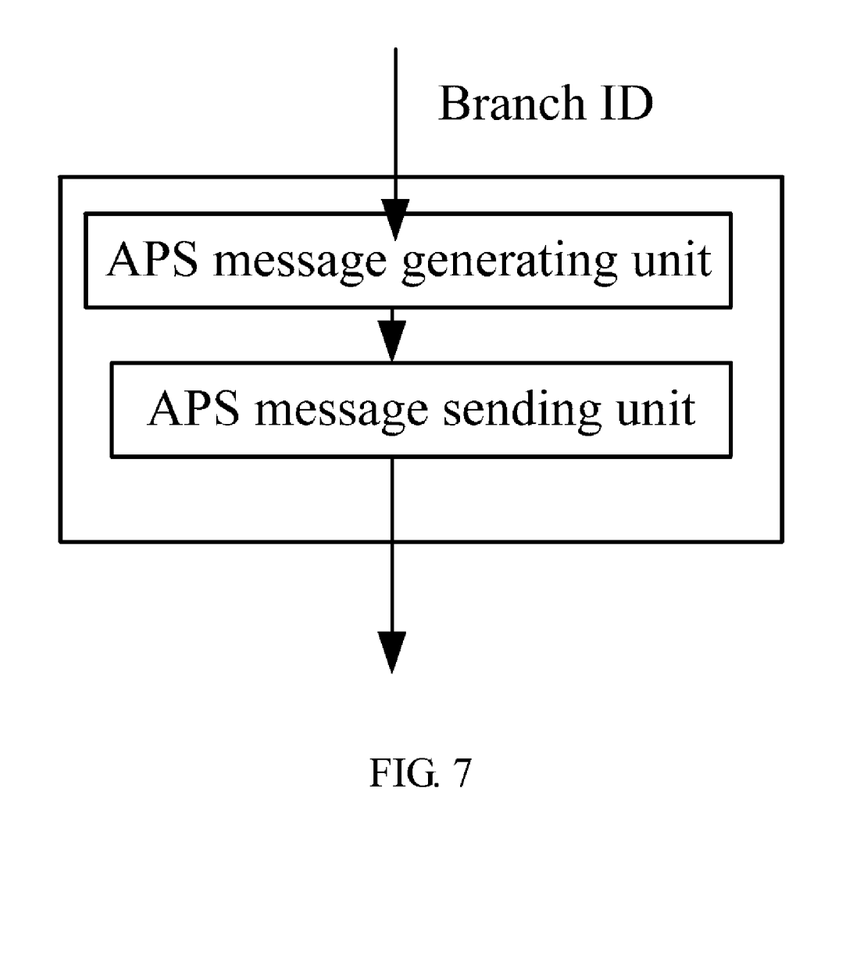
FIG. 7 shows a structure of a network device in another embodiment of the present invention.

As shown in FIG. 7, a network device is provided in another embodiment of the present invention. The network device is a root UNI of a protect E-Tree, and includes:

an APS message generating unit, adapted to: generate an APS message that carries the ID of a branch that needs to perform switching according to the obtained ID of the branch that needs to perform switching when the leaf UNI or root UNI of the work E-Tree detects a faulty branch, and trigger an APS message sending unit; and the APS message sending unit, adapted to: send an APS message that carries the ID of the branch that needs to perform switching to the root UNI of the work E-Tree when the leaf UNI of the work E-Tree detects a faulty branch; and send an APS message that carries the ID of the branch that needs to perform switching to the leaf UNI of the protect E-Tree when the root UNI of the work E-Tree detects a faulty branch.

The units of the foregoing network device are detailed in the method embodiment above, and are not described further.

After the network device receives the data packet from the root link, the sending unit of the network device performs MAC-in-MAC decapsulation for the data packet to obtain the original data packet first, encapsulates the decapsulated data packet with a downlink VLAN tag of the protect E-Tree, queries the forwarding table of the protect E-Tree, and transmits the data packet to the leaf UNI.

After the network device receives the data packet from the network interface, the sending unit of the network device deletes the protect E-Tree VLAN tag from the received data packet to obtain the original data packet; and then performs MAC-in-MAC encapsulation for the original data packet according to the root link information, namely, adds an outer Ethernet header to the exterior of the original data packet, by using the MAC address of the work E-Tree root UNI as a destination address, using the MAC address of the protect E-Tree root UNI as a source address, and using the VLAN information configured on the root link as a VLAN tag, and then sends the encapsulated data packet to the work E-Tree root UNI through the root link.

Although the IPTV service is protected through the E-Tree service protection method in the embodiments, it is understandable to those skilled in the art that the embodiments are applicable to the protection of other services such as the file storage service.

To sum up, in the embodiments of the present invention, an ID is configured for each branch of the E-Tree so that the branch corresponding to the ID may be triggered to perform protection switching as required, thus improving the quality of the E-Tree service.

Although the invention has been described through some exemplary embodiments, the invention is not limited to such embodiments. It is apparent that those skilled in the art can make various modifications and variations to the invention without departing from the spirit and scope of the invention. The invention is intended to cover the modifications and variations provided that they fall in the scope of protection defined by the following claims or their equivalents.

What is claimed is:

1. A method for protecting Ethernet Tree (E-Tree) services, wherein an ID is configured for each branch of a work E-Tree and a protect E-Tree, and the method comprises:

detecting, by a leaf UNI of the work E-Tree, a branch that needs to perform switching;

by the leaf UNI of the work E-Tree, notifying the ID of the branch that needs to perform switching to a root UNI of the work E-Tree through the root UNI of the protect E-Tree, and switching data over the branch that needs to perform switching to the protect E-Tree; and switching, by the root UNI of the work E-Tree, the data over the branch that needs to perform switching from the work E-Tree to the protect E-Tree according to the ID of the branch that needs to perform switching.

2. The method of claim 1, wherein the step of notifying the ID of the branch that needs to perform switching to the root UNI of the work E-Tree through the root UNI of the protect E-Tree by the leaf UNI of the work E-Tree comprises:

by the root UNI of the protect E-Tree, generating a new Automatic Protection Switching (APS) message when the leaf UNI of the work E-Tree notifies the ID of the branch that needs to perform switching to the root UNI of the protect E-Tree through an APS message;

replicating the ID of the branch that needs to perform switching to the new APS message; and sending the new APS message to the root UNI of the work E-Tree.

3. The method of claim 1, wherein the method further comprises at least one of:

sending, by the leaf UNI, maintenance information of a client Media Access Control (MAC) address to the root UNI of the protect E-Tree;

maintaining, by the root UNI of the protect E-Tree, a stored client MAC address according to the maintenance information sent by the leaf UNI;

and sending, by the root UNI of the work E-Tree, the maintenance information of the client MAC address to the leaf UNI; and maintaining, by the leaf UNI, a stored client MAC address according to the maintenance information sent by the root UNI.

4. The method of claim 1, further comprising:

sending, by the root UNI of the work E-Tree, data that needs to be sent to the leaf UNI, to a bridge; and deciding, by the bridge, whether the data is transmitted on at least one of the work E-Tree and the protect E-Tree according to a destination Media Access Control (MAC) address of the data.

5. The method of claim 1, wherein the method further comprises at least one of the following out of:

by the root UNI of the work E-Tree, determining a first data packet that needs to be transmitted through the protect E-Tree, performing MAC-in-MAC encapsulation for the first data packet, and sending the first encapsulated data packet to the root UNI of the protect E-Tree; and, by the root UNI of the protect E-Tree, performing MAC-in-MAC decapsulation for the first encapsulated data packet, encapsulating the first decapsulated data packet with a downlink Virtual Local Area Network (VLAN) tag of the protect E-Tree to generate a new encapsulated data packet, and sending the new encapsulated data packet according to forwarding information corresponding to destination address information of the first data packet; and by the leaf UNI, determining a second data packet that needs to be transmitted through the protect E-Tree, encapsulating the second data packet with an uplink VLAN tag of the protect E-Tree, and sending the second encapsulated data packet to the root UNI of the protect E-Tree; and, by the root UNI of the protect E-Tree, performing VLAN decapsulation for the second encapsulated data packet, performing MAC-in-MAC encapsulation for the second decapsulated data packet, and sending the second MAC-in-MAC encapsulated data packet to the root UNI of the work E-Tree.

6. A method for protecting Ethernet Tree (E-Tree) services, wherein an ID is configured for each branch of a work E-Tree and a protect E-Tree, and the method comprises:

detecting, by a root UNI of the work E-Tree, a branch that needs to perform switching;

by the root UNI of the work E-Tree, notifying the ID of the branch that needs to perform switching to a leaf UNI of the protect E-Tree through the root UNI of the protect E-Tree, and switching data over the branch that needs to perform switching to the protect E-Tree; and switching, by the leaf UNI of the protect E-Tree, the data over the branch that needs to perform switching from the work E-Tree to the protect E-Tree after determining that the ID of the branch that needs to perform switching is the same as the branch ID configured in the leaf UNI of the protect E-Tree.

7. The method of claim 6, wherein the step of notifying the ID of the branch that needs to perform switching to the leaf UNI of the protect E-Tree through the root UNI of the protect E-Tree by the root UNI of the work E-Tree comprises:

by the root UNI of the protect E-Tree, generating a new Automatic Protection Switching (APS) message when the root UNI of the work E-Tree notifies the ID of the branch that needs to perform switching to the root UNI of the protect E-Tree through an APS message;

replicating the ID of the branch that needs to perform switching to the new APS message; and sending the new APS message to the leaf UNI of the protect E-Tree.

8. The method of claim 6, wherein the method further comprises at least one of the following out of:

by the root UNI of the work E-Tree, determining a first data packet that needs to be transmitted through the protect E-Tree, performing MAC-in-MAC encapsulation for the first data packet, and sending the first encapsulated data packet to the root UNI of the protect E-Tree; and, by the root UNI of the protect E-Tree, performing MAC-in-MAC decapsulation for the first encapsulated data packet, encapsulating the first decapsulated data packet with a downlink Virtual Local Area Network (VLAN) tag of the protect E-Tree to generate a new encapsulated data packet, and sending the new encapsulated data packet according to forwarding information corresponding to destination address information of the first data packet; and by the leaf UNI, determining a second data packet that needs to be transmitted through the protect E-Tree, encapsulating the second data packet with an uplink VLAN tag of the protect E-Tree, and sending the second encapsulated data packet to the root UNI of the protect E-Tree; and, by the root UNI of the protect E-Tree, performing VLAN decapsulation for the second encapsulated data packet, performing MAC-in-MAC encapsulation for the second decapsulated data packet, and sending the second MAC-in-MAC encapsulated data packet to the root UNI of the work E-Tree.

9. A method for protecting Ethernet Tree (E-Tree) services, wherein an ID is configured for each branch of a work E-Tree and a protect E-Tree, and the method comprises:

determining a branch that needs to perform switching;

notifying the ID of the branch that needs to perform switching to the work E-Tree through a root User Network Interface (UNI) of a protect E-Tree;

switching data over the branch that needs to perform switching from the work E-Tree to the protect E-Tree according to the ID of the branch that needs to perform switching;

and at least one of the following out of:

by a root UNI of the work E-Tree, determining a first data packet that needs to be transmitted through the protect E-Tree, performing MAC-in-MAC encapsulation for the first data packet, and sending the first encapsulated data packet to the root UNI of the protect E-Tree; and, by the root UNI of the protect E-Tree, performing MAC-in-MAC decapsulation for the first encapsulated data packet, encapsulating the first decapsulated data packet with a downlink Virtual Local Area Network (VLAN) tag of the protect E-Tree to generate a new encapsulated data packet, and sending the new encapsulated data packet according to forwarding information corresponding to destination address information of the first data packet; and by a leaf UNI, determining a second data packet that needs to be transmitted through the protect E-Tree, encapsulating the second data packet with an uplink VLAN tag of the protect E-Tree, and sending the second encapsulated data packet to the root UNI of the protect E-Tree; and, by the root UNI of the protect E-Tree, performing VLAN decapsulation for the second encapsulated data packet, performing MAC-in-MAC encapsulation for the second decapsulated data packet, and sending the MAC-in-MAC encapsulated data packet to the root UNI of the work E-Tree.

10. A system for protecting Ethernet Tree (E-Tree) services, wherein the system comprising a work E-Tree and a protect E-Tree;
a first root User Network Interface (UNI) and a plurality of leaf UNIs form the work E-Tree, the first root UNI and one of the plurality of leaft UNIs constitutes a branch, an ID is configured for each branch;
a second root UNI and the plurality of leaf UNIs form the protect E-Tree, the first root UNI is connected to the second root UNI;
one of the plurality of leaf UNIs detects a branch that needs to perform switching, notifies the ID of the branch that needs to perform switching to the first root UNI through the second root UNI, and switches data over the branch that needs to perform switching to the protect E-Tree; and
the first root UNI switches the data over the branch that needs to perform switching from the work E-Tree to the protect E-Tree according to the ID of the branch that needs to perform switching.

11. The system of claim 10, wherein
the first root UNI determines a data packet that needs to be transmitted through the protect E-Tree, performs MAC-in-MAC encapsulation for the data packet, and sends the encapsulated data packet to the second root UNI; and the second root UNI performs MAC-in-MAC decapsulation for the encapsulated data packet, encapsulates the decapsulated data packet with a downlink Virtual Local Area Network (VLAN) tag of the protect E-Tree to generate a new encapsulated data packet, and sends the new encapsulated data packet according to forwarding information corresponding to destination address information of the data packet.

12. The system of claim 10, wherein
one of the plurality of leaf UNIs determines a data packet that needs to be transmitted through the protect E-Tree, encapsulates the data packet with an uplink VLAN tag of the protect E-Tree, and sends the encapsulated data packet to the second root UNI; and the second root UNI performs VLAN decapsulation for the encapsulated data packet, performs MAC-in-MAC encapsulation for the decapsulated data packet, and sends the MAC-in-MAC encapsulated data packet to the first root UNI.

13. A system for protecting Ethernet Tree (E-Tree) services, wherein the system comprising a work E-Tree and a protect E-Tree;
a first root User Network Interface (UNI) and a plurality of leaf UNIs form the work E-Tree, the first root UNI and one of the plurality of leaft UNIs constitutes a branch, an ID is configured for each branch;
a second root UNI and the plurality of leaf UNIs form the protect E-Tree, the first root UNI is connected to the second root UNI;
the first root UNI detects a branch that needs to perform switching, notifies the ID of the branch that needs to perform switching to one of the plurality of leaf UNIs through the second root UNI, and switches data over the branch that needs to perform switching to the protect E-Tree; and
the one of the plurality of leaf UNIs switches the data over the branch that needs to perform switching from the work E-Tree to the protect E-Tree after determining that the ID of the branch that needs to perform switching is the same as the branch ID configured in the one of the plurality of leaf UNIs.

14. The system of claim 13, wherein
the first root UNI determines a data packet that needs to be transmitted through the protect E-Tree, performs MAC-in-MAC encapsulation for the data packet, and sends the encapsulated data packet to the second root UNI; and the second root UNI performs MAC-in-MAC decapsulation for the encapsulated data packet, encapsulates the decapsulated data packet with a downlink Virtual Local Area Network (VLAN) tag of the protect E-Tree to generate a new encapsulated data packet, and sends the new encapsulated data packet according to forwarding information corresponding to destination address information of the data packet.

15. The system of claim 13, wherein
one of the plurality of leaf UNIs determines a data packet that needs to be transmitted through the protect E-Tree, encapsulates the data packet with an uplink VLAN tag of the protect E-Tree, and sends the encapsulated data packet to the second root UNI; and the second root UNI performs VLAN decapsulation for the encapsulated data packet, performs MAC-in-MAC encapsulation for the decapsulated data packet, and sends the MAC-in-MAC encapsulated data packet to the first root UNI.

* * * * *